June 1, 1971      F. E. BARTHELL      3,582,457

HEAT SHRINKABLE COMPONENTS WITH MELTABLE INSERT LINER

Filed Dec. 19, 1967

INVENTOR
FRANK E. BARTHELL
BY *Francis J. Thornton*
ATTORNEY

United States Patent Office 3,582,457
Patented June 1, 1971

3,582,457
HEAT SHRINKABLE COMPONENTS WITH MELTABLE INSERT LINER
Frank E. Barthell, Dracut, Mass., assignor to Electronized Chemicals Corporation, Burlington, Mass.
Filed Dec. 19, 1967, Ser. No. 691,791
Int. Cl. B32b 31/28; H02g 3/06
U.S. Cl. 161—166     6 Claims

ABSTRACT OF THE DISCLOSURE

A heat deformable device comprising an outer, heat shrinkable, self deformable layer containing an insert liner which will, in the presence of the deforming heat, melt and fuse to articles telescoped in the device and which contains an integral treated region which prevents the extrusion of the melted fluid material from between the deformable outer layer and the telescoped article.

BACKGROUND OF THE INVENTION

Many synthetic and natural materials have long been used for packaging, covering and/or encapsulating numerous articles. Such materials range from the natural rubbers through the well known cellophanes and polyvinyl chlorides to the newer olefins. These materials have been made in any number of possible configurations such as bags, boots, sleeves, tubes, etc. Each such material and configuration has its own characteristics which makes it suitable for specific purposes and applications which cannot be adequately performed by the other materials.

Among these newer materials which however have received remarkable acceptance in numerous applications, hitherto considered the private reserve of other materials, heat shrinkable, oriented, elastic memory, polyolefin. This unique and versatile material can be used in almost any application wherein skin tight packaging or encapsulation is desirable.

This material has found such universal acceptance because of its unique ability, upon the application of only moderate temperatures in the order of 275° F., to shrink and mold itself around smooth or irregular objects to form a tight protective jacket. Moreover, the material does not split or rupture while shrinking over irregular objects, will shrink over 50% of its own diameter, retains excellent dielectric and mechanical strengths while maintaining flexibility, and can be made flame retardant and produced in a number of colors ranging from white to black. Still further such material can be made in a variety of shapes such as tubes, rods, caps, Y's, T's, etc.

More recently the art has seen the advent of the heat recoverable article which contains fusible material which will melt under the influence of the heat needed for activation of the elastic memory of the article itself. The purpose of this fusible material being to tightly bond or encapsulate any item telescoped within the outer elastic sleeve.

When the heat recoverable article is in the form of an end-cap or tubing, the compressive forces supplied by the shrinking tube, in the presence of heat, however, causes the fusible material to extrude out of the heat shrunk article leaving behind voids in which corrosion can occur. Furthermore, extrusion of material gives an undesirable appearance to the finished product. One attempt in the prior art to control this extrusion consisted of the insertion of a separate infusible member between the end of the recoverable article and the fusible insert such that this separate member acts as a "dam" to the fusible material.

Although in many circumstances this member is suitable and quite effective the additional labor cost of producing it and inserting it into the heat shrinkable member does not warrant its use in certain applications. In particular the cost of placing this item in the shrinkable article can be a significant portion of the retail price of the final product for it must be made over-size to snugly fit within the heat shrinkable article so that it will not be inadvertently lost by shipping, impact, vibration and the like.

DESCRIPTION OF THE INVENTION

The present inventor has now discovered a unique means for creating a fusible insert liner which has incorporated therein a self-damming device which cannot be separately removed but which will serve to retain the fusible material when in liquid form and even when subjected to the compressive forces of the heat shrunk body.

Figure 1:
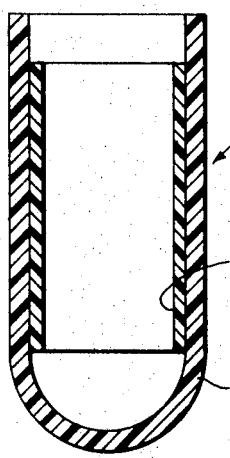
FIG. 1 illustrates an embodiment of the present invention in which the heat recoverable article is closed at one end to form an end cap.
Figure 2:
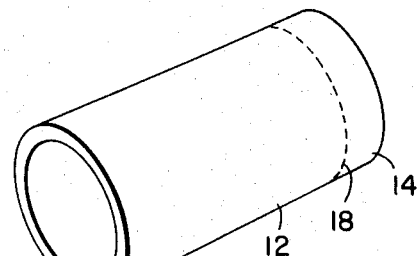
FIG. 2 illustrates one embodiment of the fusible self-damming member of the invention.

Referring now to the drawings and more particularly to FIGS. 1 and 2 of the present invention. The present invention and a method of producing it will be discussed in detail. For the sake of convenience the invention will be described initially in the form of an end cap but it should be thoroughly understood that the invention can be in the form of a tube, ring or other device.

The end cap 10 shown in FIG. 1 comprises an outer body such as a tubular shell or jacket 11 of heat shrinkable, elastic memory oriented material containing therein a cylindrical sleeve or insert liner 12. In one preferred embodiment the outer member or shell consists of a filled polyolefin such as modified polyethylene to which there has been added a flame retardant, an anti-oxidant, a vinyl stabilizer, and an inert, inorganic carrier. Such materials are commercially available from sources such as the Union Carbide Corporation or the Du Pont Corporation.

The shell may be composed as follows:

Solid polyethylene: 50 to 75% by weight
Antimonytrioxide: 15 to 35% by weight
Solid chlorowax containing between 55 and 80% chlorine: 5 to 15% by weight
An antioxidant: .1 to 1% by weight
Other ingredients: 1 to 10% by weight The outer tube 11 may be adjusted to be low, medium or high density as classed by ASTM-D-1248. However, for reasons of flexibility the outer jacket material should be of low density or relatively thin wall.

The selected material used for the outer jacket 11 is particularly characterized by the fact that it can be readily extruded in tubular form and have induced therein a plastic memory. To this end the selected polyolefin material is placed in a screw extruder. When producing a tube an MPM screw extruder can be used. The selected material is placed in the extruder in pellet form and extruded therefrom as a tubing preferably having a 10 mill wall thickness. The described extruder operates with the following temperatures.

|  | ° F. |
|---|---|
| Rear heat zone | 280–320 |
| Center heat zone | 300–340 |
| Front heat zone | 300–350 |
| Gate | 280–320 |
| Die | 280–320 |

After extrusion, the tubular member 11 is treated to form an end cap. Basically this treatment comprises three steps of manufacture. The three steps consist of first closing and molding the end of a piece of extruded plastic tubing to a closed ended piece having a U-shaped longitudinal section. This is done by heating the tip end of the tubing in a closed mold and simultaneously applying axial pressure to force the end to conform to the mold shape. Also simultaneously an internal mandrel also under axial pressure shapes the inner surface of the article to provide dimensional stability at elevated temperatures by crosslinking the article in this case by electron beam irradiation. Preferably the electron beam irradiation is derived from electron beam source such as a one million electron volt insulating core transformer sold by High Voltage Engineering Corporation which has an output of at least one megarad. Throughout this specification high energy ionizing radiation is given in a unit of absorbed radiation dose called the rad. The rad is herein defined as an absorbed dose of 100 ergs. of energy per gram of absorbing material.

It has been discovered that the selected dose for the above described tubing may be arbitrarily selected anywhere in the range of 5 to 50 megarads. In the initial experiments a dose of 15 megarads was used and subsequent experiments established a working range of 5 to 50 megarads. Because irradiation is used to provide the plastic memory to the unit, catalysts are not required. Thus the outer tubing has no unreacted catalyst therein which can cause later difficulties and which are substantially uncontrollable. Following the irradiation the closed end cap is then heated and internal air pressure is applied, so that the end cap is inflated in a controlled manner to conform to the shape of an external mold. In this case a removable sleeve is retracted from within the irradiated heated end cap so that the inflation will proceed in an orderly fashion from the closed end of the external mold to the open end. Following expansion of the device and conformance of the material with the external mold the article is cooled below 275° F. in its expanded condition and removed from the mold. When the base material is composed of the described polyolefin it should for best results be stretched at least 50% in its diameter but not more than 200%. Upon heating the expanded item will of course return to its original unexpanded form.

Simultaneously with the formation of the outer jacket 11, its irradiation and expansion, the inner meltable liner 12 is also being extruded from a separate and distinct extruder. This extruder is identical to extruder described above. However, since in this case the inner liner 12 comprises a modified polyolefin which is thermoactive at a temperature between room temperature (78° F.) and the shrinking temperature of the irradiated base material 11 different temperatures must be used for its extrusion.

More particularly the inner liner 12 consists of any one of a number of crosslinkable materials such as, selected polyolefins, polyvinylhalides, polyacrylates, polysilastic rubbers, polybutadiene rubbers and the like. Specifically those polyolefins include the ethylene copolymers such as ethylene ethyl acrylate which do not need plasticizers for flexibility. The liner may be a blend of any of the above. In addition the liner may contain a small portion of non-crosslinkable materials such as atactic polypropylene which gives excellent adhesiveness and flexibility. The non-crosslinkable additive is selected to give the liner a specific property such as high adhesive strength.

Typically, liner materials which successfully bond to most surfaces are excellent liner materials. These materials should exhibit elastomeric properties necessary to conform readily to irregular surfaces. These materials should crosslink most efficiently, somewhat better than crosslinkable plasticized vinyl halides for example. One typical material is ethylene ethyl acrylate copolymer which melts and flows in the range of the recovery temperature of the jacket.

In any of the described materials, antioxidants, colors, antiblocking agents, etc., may be added without changing the concept of the invention.

The modified crosslinkable material used in creating liner 12 therefore is a thermoactive material which has elastomateric properties similar to rubber such as good, low temperature flexibility, high impact strength and high elongation. In any event the liner 12 must exhibit, at the recovery temperature of the jacket 11, a fluid condition unless treated as described herein so that it will readily mold itself around any item telescoped within the open end of jacket 11 and must be crosslinkable by high energy ionizing radiation.

The copolymers above described are particularly desirable for use as liner 12 for they can be modified as above described to exhibit various properties. Thus, for example, high ethylene, low copolymer mixtures are similar in properties to the pure polyethylenes while high copolymer, low ethylene mixtures resemble gum rubber. Moreover, the copolymers performance should accept high filler loadings without excessive loss of good physical properties. Such fillers should change only the materials' melt index such that the mixtures softening temperature range is narrowed. Such fillers can also be used to make material flame retardant, semi-conducting, or the like.

By carefully compounding the material for liner 12 it has been found that it can be provided with certain selected characteristics which make it particularly useful in the present invention. In one specific embodiment the material is a ethylene ethylacrylate copolymer such as sold under the trade name Union Carbide D PD–6169. This material is found to have, when solid, high impact resistance, excellent resistance to tearing or cracking due to age, high resistivity, and when heated a softening temperature at about 250° F. and excellent molding properties. This material further has a density of about .93 and a melt index of 6.

As was previously mentioned, this material is also extruded in the form of a tube from an MPM screw extruder. In this instance the die used extruded the tubing to an outer diameter approximately the same as the inner diameter of the outer shell 11. Here the wall was also approximately 10 mils in thickness. The selected material was extruded with the following temperatures:

|  | ° F. |
|---|---|
| Rear heat zone | 230–250 |
| Center heat zone | 230–250 |
| Front heat zone | 245–265 |
| Gate | 250–270 |
| Pipe | 245–265 |
| Die | 270–300 |

Figure 4:
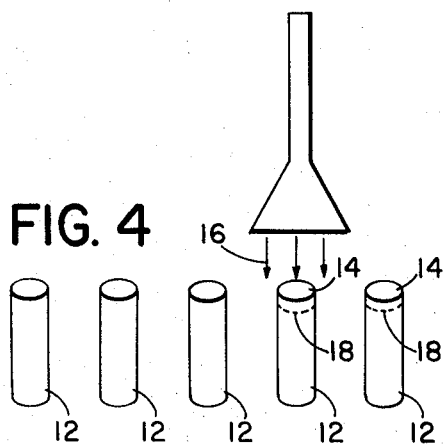
FIG. 4 illustrates schematically the method of producing the member of FIG. 2.

Following formation of the liner 12 in tubular form it passes beneath a Foster Allen rotating blade cutter where it is sliced into any desired length. After slicing the material is fed beneath an electron beam accelerator. The accelerator is substantially identical to the accelerator previously mentioned in conjunction with the irradiation of outer jacket 11. However, in this instance the accelerator must be capable of providing at least a 10 megarad dose to the item passing there beneath. In the described embodiment the insert 12 is shown as an extended tube. In this embodiment only the small end ring portion 14 of the tube need be crosslinked to prevent its melting. In order to so crosslink only this portion 14 the insert 12 must be so exposed to high energy ionizing radiation that only portion 14 becomes crosslinked. To this end the inserts 12 are passed from left to right as shown in FIG. 4, beneath an accelerated electron beam with their longitudinal axes extending in the direction of the beam (depicted by arrows 16). In one specific example the cut inserts 12 were passed beneath a one mev. machine capable of delivering a 10 megarad dose to the product beneath the window when the window is approximately 7 inches above the uppermost region 14 of insert 12. Under these circumstances approximately .130 inch of depth of the tube 12 is irradiated and crosslinked so that under the influence of heat this irradiated portion 14 of insert 12 does not melt but only collapses so as to form a self-damming region around any material telescoped within the device 10 of FIG. 1. The extent of this crosslinking is shown by dotted line 18. Following irradiation of the material it is removed from within the reactor and placed within the outer jacket 11 by any convenient means.

The completed product, as appearing in FIG. 1, is now ready for use as a commercial product.

This unique combination of a heat shrinkable end cap containing but a single insert which includes incorporated therein a self-damming feature now opens the door to cheap, easy and satisfactory solution of many problems which hitherfore could not be solved or which were solved only in the unsatisfactory or expensive way of providing a separable rigid nonmeltable insert in the tubing in addition to the meltable insert.

The following brief treatise will describe a few such applications. When wires are spliced it is necessary to remove the outer insulating jacket and to wind them together with perhaps a layer of solder thereon to provide good electrical connection, following which the wires are taped or otherwise covered with an insulative member such as a solderless connector. The present invention provides means whereby the insertion of the item of FIG. 1 placed upon the bared ends of the wires virtually forms under the influence of moderate heat a smooth, closely conforming insulating coating. The device of FIG. 1 provides the unit with adequate electrical and mechanical strength. Because the heating required to deform the outer jacket 11 also causes melting of the unirradiated portion of liner 12, the unirradiated portion of liner 12 melts and molds itself around the exposed ends of the wires. This conformance to the exposed ends of the wires is, of course, increased by the compressive effect by the contraction of the outer jacket 11 which shrinks opposite to the direction in which it was previously expanded. This shrinkage exerts a large compressive force on the melted liner 12 such that it is forced into the openings existing between the wires. Simultaneously because the end portion 14 of insert 12 has been irradiated, it does not become fluid under the influence of heat but merely collapses under the compressive force of the outer jacket 11 preventing the extrusion of any of the now fluid material of the unirradiated portion of liner 12. Moreover because of the constitution of the liner 12 the material when in a fluid condition becomes extremely tacky and adheres to the outer jacket 11 as well as to the wires themselves. Upon the removal of heat the melted region of liner 12 solidifies in place, thus the wires are provided with a tight adherent closely conforming weather tight, air tight, fungus resistant, adhesive end cap. This completed seal moreover is abrasion resistant, low cost, mechanically strong and of long life.

Figure 3:
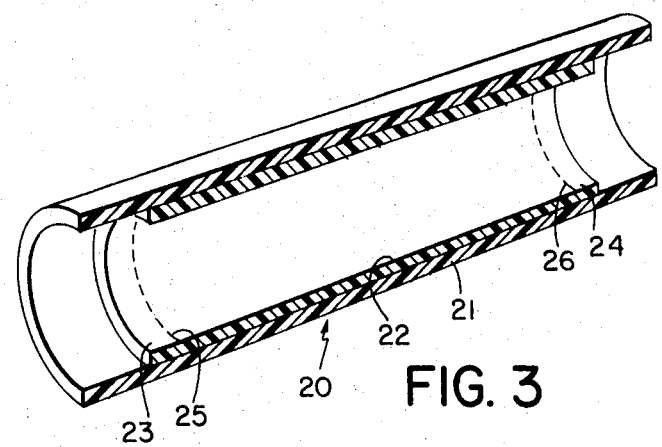
FIG. 3 illustrates another embodiment of the invention in which the article has an open cylindrical shape.

As shown in FIG. 3, the invention can also readily assume the form of an open ended tube or cylinder 20. In this view, the outer jacket 21 has therein an insert 22 irradiated at both ends to create crosslinked regions 23 and 24 defined by dotted lines 25 and 26 respectively. This irradiation is accomplished in the identical manner as that described in conjunction with FIG. 3 in which the material is passed beneath the beam twice so that the beam first penetrates one end of the liner and then penetrates the other end of the liner to the same depth. Thus, only the ends 23 and 24 are made temperature resistant while the central portion of liner 22 remains meltable at the jackets memory activation temperature. It should, of course, be understood that when materials other than the specifically described one is used, the radiation required for their crosslinking may need to be varied from that given in this specific embodiment. In general, however, for most materials radiation doses in excess of one megarad are required. Still further, the melt index for the liner 12, when unirradiated, can be varied from that given in the example and can range from 0.1 upwards.

In addition to the previously described polymers, the outer jacket 11 may be composed of fluorinated ethylene propylene, (FEP), TFE Teflon or polyethylene terephthalate. In which event the liner 12 must have its composition adjusted to melt at the activation temperture of the jacket. For example, when the jacket 11 is fluorinated ethylene propylene it can have a plastic memory induced therein which recovers at a temperature of 350° F. Therefore, the liner 12 would be composed of polyvinylidene fluoride (Kynar) with a 340° F. softening temperature.

Having now described the invention and several embodiments and applications therefore, and since others will now become apparent to those skilled in the art, it is desired that the invention be limited only by the following claims.

I claim:

1. A polymer laminate assembly comprising a hollow body of flexible, oriented thermoplastic having a heat activatable memory therein, said hollow body having at least one open end, said memory being activatable at a temperature above room temperature to induce a major dimensional change in said body and a non-heat shrinkable unoriented crosslikable thermoplastic insert liner disposed within said body, said insert liner having a portion thereof cross-linked to substantially prevent the melting of said portion at the heat deformable temperature used to activate the memory of said body, said body being selected from the class consisting of fluorinated ethylene propylene polymer, tetrafluoroethylene, polyethylene terephthalate and polyethylene, said insert liner being selected from the class of material consisting of polyolefin, polyvinylhalide, polyacrylate, polysilastic rubber, and butadiene rubbers, said crosslinked portion of said insert liner being positioned between the open end of said hollow body and the remainder of said insert liner.

2. The assembly of claim 1 wherein at 25° C. the non-crosslinked portion of the insert liner has sufficient strength to permit the insert to support itself independently of said body and has a softening temperature substantially equal to the memory activation temperature of said body.

3. The assembly of claim 1 wherein said body comprises a crosslinked flexible extended polyethylene having a heat activatable memory at a temperature of about 275° C. said insert liner having a portion thereof whose softening temperature is substantially equal to said memory activation temperature and which is extrudable and adhesive at said temperature and a crosslinked portion which is non-extrudable and non-adhesive at said temperature.

4. The article of claim 1 wherein said insert liner is tubular and has, at one and thereof, a ring approximately 0.1 inch in length, along the longitudinal axis of the tube, said ring being cross-linked to prevent the melting of said ring at the heat activation temperature of said body.

5. The laminate of claim 1 wherein said body comprises fluorinated ethylene propylene polymer and said insert liner comprises polyvinylidene fluoride.

6. A tubular article comprising a tube of solid cross-linkable polymer, self-sustaining in thin film form, selected from the class of materials consisting of polyvinylhalide, polyacrylate, polysilastic rubber, polybutadiene rubber and a polyethylene rubber distended radially and a layer of material within said tube selected from the same class of material but differing from said tube in that said layer has a softening point at the relaxation temperature of said polymer of said tube, said material of said layer comprising a meltable and crosslinkable polymer, and having at each end thereof a region crosslinked to increase its softening temperature to above the activation memory temperature of said body.

References Cited

UNITED STATES PATENTS

| | | | |
|---|---|---|---|
| 3,488,715 | 1/1970 | Atkins | 161—203 |
| 3,451,609 | 6/1969 | Gillett | 228—56 |
| 3,455,336 | 7/1969 | Ellis | 138—156 |
| 2,919,473 | 1/1960 | Cole | 161—412X |
| 3,157,560 | 11/1964 | Livingston et al. | 161—189X |
| 3,243,211 | 3/1966 | Wetmore | 287—78 |
| 3,272,684 | 9/1966 | Moore | 161—412X |
| 3,312,772 | 4/1967 | Sherlock | 174—75 |
| 3,454,461 | 7/1969 | Paxton | 161—189 |

FOREIGN PATENTS 236,241  9/1960  Australia.

HAROLD ANSHER, Primary Examiner

U.S. Cl. X.R.

161—189, 412; 174—84; 287—78; 339—275